Figure 1:
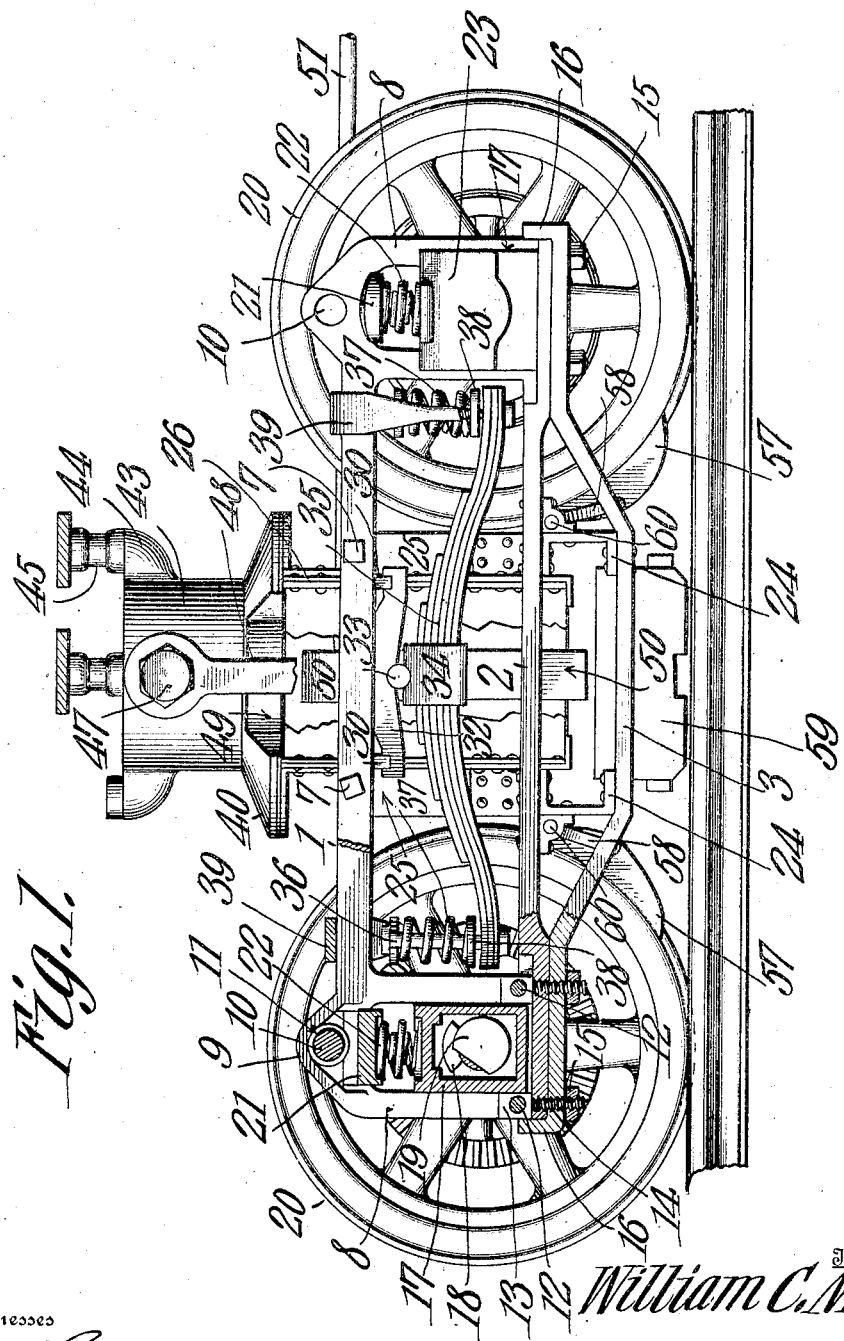

No. 896,741. PATENTED AUG. 25, 1908.
W. C. MAYO.
CAR TRUCK.
APPLICATION FILED NOV. 25, 1907.

4 SHEETS—SHEET 1.

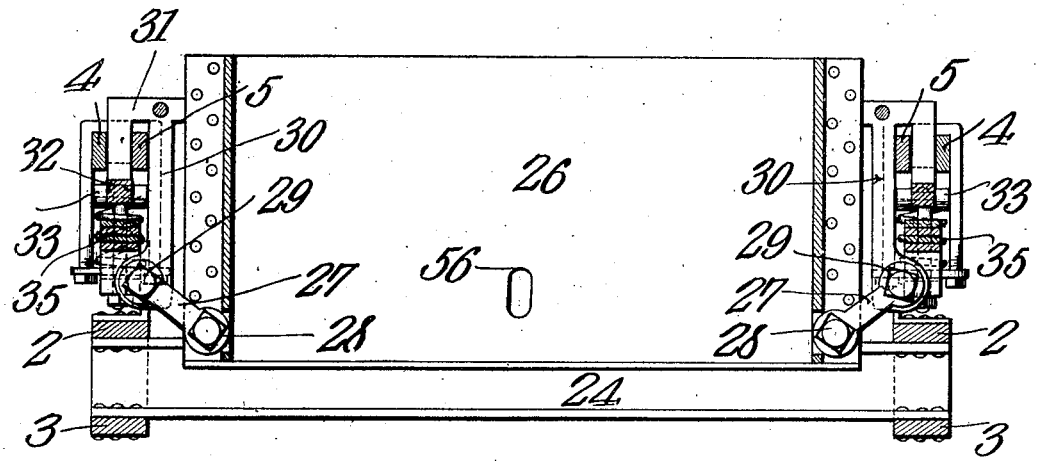
Fig. 3.
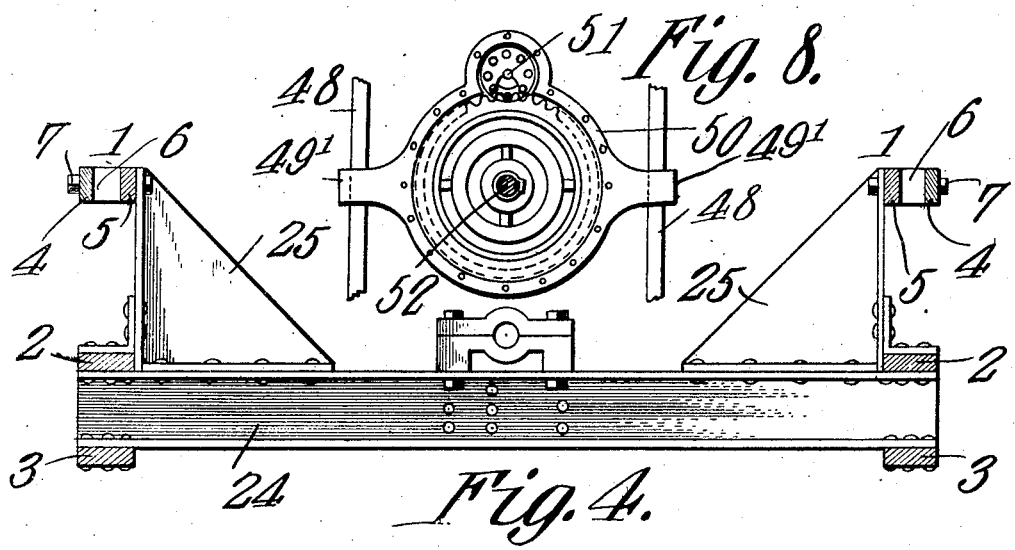
Fig. 8.
Fig. 4.

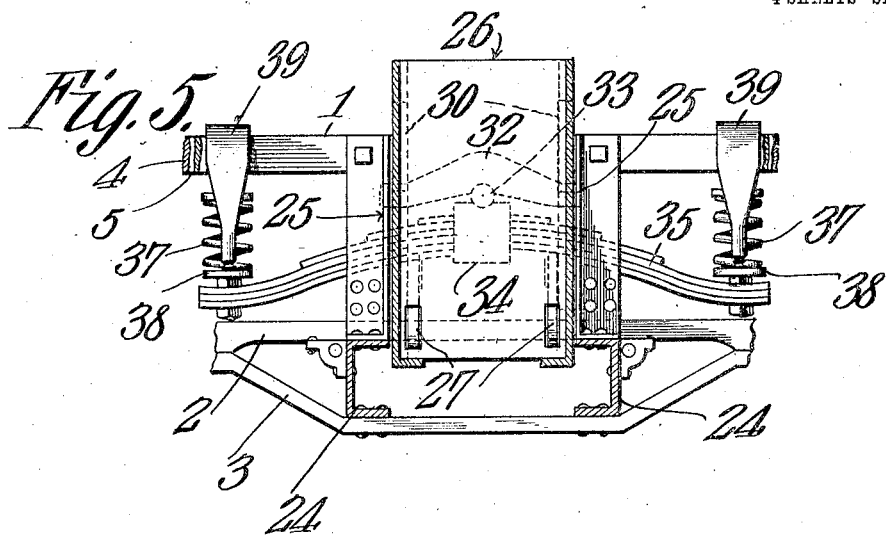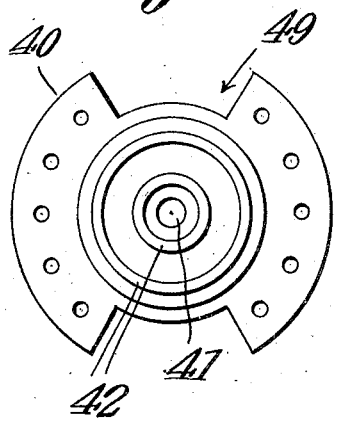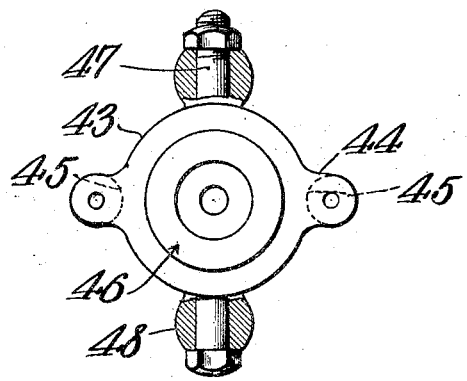

UNITED STATES PATENT OFFICE.

WILLIAM C. MAYO, OF EL PASO, TEXAS, ASSIGNOR, BY DIRECT AND MESNE ASSIGNMENTS, OF TWO-THIRDS TO HIMSELF, AND GEORGE E. BRIGGS, OF BARSTOW, TEXAS, AND ONE-THIRD TO JOHN HOULEHAN, OF EL PASO, TEXAS.

CAR-TRUCK.

No. 896,741.   Specification of Letters Patent.   Patented Aug. 25, 1908.

Application filed November 25, 1907. Serial No. 403,773.

To all whom it may concern:

Be it known that I, WILLIAM C. MAYO, a citizen of the United States, residing at El Paso, in the county of El Paso and State of Texas; have invented a new and useful Car-Truck, of which the following is a specification.

This invention has reference to improvements in car trucks, and is designed to provide a car truck structure especially adapted for high speed heavy cars and for the reception of driving means where the prime mover is on the body of the car and not in the truck.

The present invention is particularly useful in connection with a traction system which I have in part devised wherein the cars are each a complete unit preferably using a prime mover in the form of an explosive engine of high power, and these cars are intended for either city, suburban, or interstate traffic, and particularly where high speed is to be maintained, even on curves, in which latter case the trucks are automatically constrained to hug the track and are therefore subjected to heavy strains due to the tendency of the heavy car body to follow a straight course when entering a curve.

The object of the present invention is to provide a car truck which will stand up under the unusually heavy strains due to high speed and massive equipment, and which without undue weight will have ample margin of safety, but which is also well adapted to receive transmission mechanism in cases where motive element is secured to the car and not to the truck.

The invention comprises a truck frame in which the axle journal boxes are mounted in yokes formed at the ends of a heavy compound connecting bar on each side of the truck, and the yokes are likewise connected together by a truss structure which will resist heavy strains. The truss connections and compound bars on the two sides of the truck are connected together by channel bolsters and bracket plates. Between the channel bolsters and the connecting parts coacting therewith there is located a box girder carrying at its upper end a circular bearing head supporting a similar head fast on the bottom of the car, and the two heads are secured together by a suitable king bolt. The box girder is connected to the main part of the truck by link connections which permit the girder to have vertical movement with relation to the truck through interposed springs, and the support for the girder upon the springs is by means of an equalizer structure on each side of the truck.

Since in the system to which this invention particularly relates, although not necessarily confined thereto, the prime mover is carried upon the body of the car, both axles of the truck, considering a four-wheel truck, are utilized as drive axles. For this purpose, there is employed a universal transmission gear such as is shown and described in application No. 391,525, filed Sept. 5, 1907 by myself and my collaborator, John Houlehan, and in the present invention, the truck is provided with suitable supporting means adapted to carry such universal transmission gear with provision for holding one member of the same in fixed relation to the car body with respect to the turning movement of the truck, but permitting the car body to move up and down with relation to the car truck through the intermediary of the springs, permitting, therefore, a relative vertical movement between the car body and transmission gear.

Figure 2:
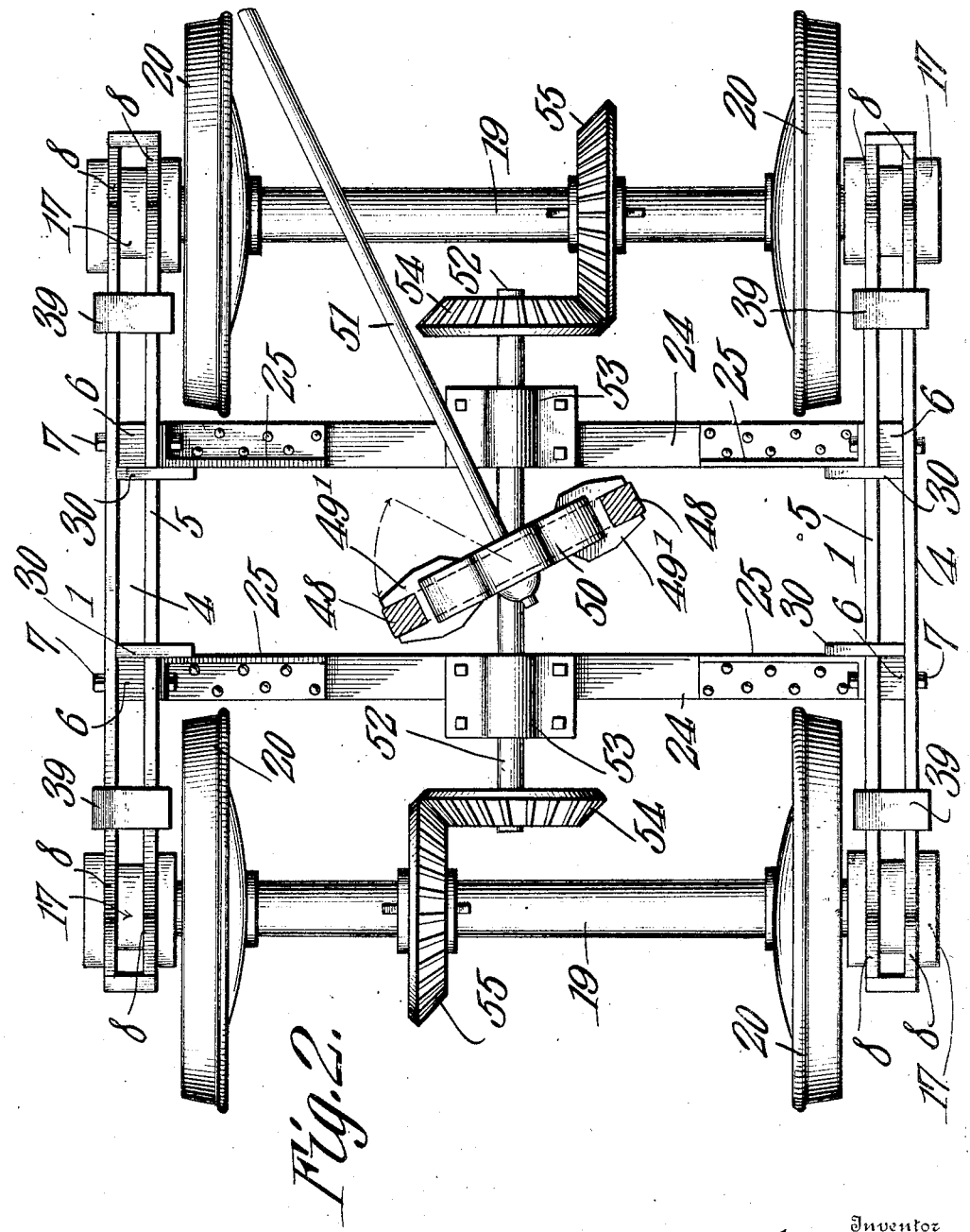

The invention will be best understood from a consideration of the following detail description, taken in connection with the accompanying drawings forming part of this specification, in which drawings, Figure 1 is a side elevation of the truck with some parts shown in section. Fig. 2 is a plan view with parts omitted. Fig. 3 is a central section with some parts cut by the section omitted and also the more distant parts omitted. Fig. 4 is a detail section showing one of the channel girders connecting the side frames of the truck. Fig. 5 is a cross section of the box girder showing some of the remoter parts in elevation. Figs. 6 and 7 are detail views of the connecting element between the truck and car body and on which the truck pivots. Fig. 8 is a detail view of the transmission gear.

Referring to the drawings, the side member of the truck is shown as composed of an upper tie bar 1, a lower tie bar 2, and an arch bar 3 coacting with the lower tie bar. The upper bar 1 is composed of two members 4, 5 spaced apart by spacing blocks 6 and secured together by bolts 7. Each member of the tie bar terminates in a pedestal 8 arched at its upper end, as shown at 9, and there connected by a bolt or rivet 10 carrying a spacing sleeve 11. In the assembling of the members of the tie bar 1, either bolts or rivets, or both, may be used. The lower ends of the legs of the pedestal 8 are connected by bolts or rivets 12 passing through spacing blocks 13 on which are formed downwardly extending threaded stems 14 receiving nuts 15. The stems 14 receive the ends of the other tie bar 2 connecting the lower ends of the pedestals and also receive the ends of the arch bar 3, the latter being upturned at its extreme ends, as indicated at 16, to partially embrace the ends of the lower tie bar.

In the pedestals are journal boxes 17 channeled at the sides to receive the legs of the pedestals, so that these journal boxes may have a relative up and down movement in the pedestals. The journal boxes are provided with bearing brasses 18 engaging the journal ends of the axles 19 in the usual manner, and upon these axles are mounted the wheels 20 of any suitable type.

In the arched portion of each pedestal there is located a crown block 21 between which and the respective journal box 17 there is confined a heavy compound spring 22. Each journal box is provided with the usual pivoted cover 23. Secured to the lower tie bar and to the arch bar are two channel beams 24, 24 extending from one side member of the truck across to the other side member of the truck between the wheels, and connecting these channel beams to the upper tie bar are angle plates 25, best shown in Fig. 4.

Within the space between the channel beams, and angle plates 25, there is located a box-girder bolster 26, best shown in Figs. 3 and 5. This bolster is supported at the ends by links 27 pivotally connected at one end to the girder by bolts 28 and pivotally connected at the other end by bolts 29 to the lower ends of hangers 30, the upper ends of which latter are formed into hooked-shaped extensions embracing the inner members of the tie bar 1. The free ends of the hooks 31 on each side of the truck engage an equalizer bar 32, the center of which latter rests upon a double head gib roller 33 seated in arcs in the equalizer bar and in a cuff 34 embracing the central portion of a heavy elliptical leaf spring 35. The free ends of each spring 35 are supported by a stirrup bolt 36 upheld by a heavy spiral spring 37 engaging at its lower end with a cross piece 38 carried by a saddle 39 riding the upper tie bar 1 close to the respective pedestal. This places the weight of the car very close to the journals of the axles.

Secured to the center of the bolster at the top thereof is a center plate in the form of a circular casting 40 having a central perforation 41 for the passage of the king bolt, and surrounding this perforation the top of the plate or casting is formed with concentric angular ribs 42.

Fast on the bottom of the car body is a circular casting 43 having peripheral brackets 44 formed thereon and from which extend bolts or other securing means, not shown, through spacing blocks 45 to the car bolster. The under face of the casting 43 is formed with an annular boss 46 entering between the annular ribs of the plate or casting 40. By the application of a king-bolt (not shown) the plate 40 and casting 43 are securely coupled, but in such manner that one is free to turn with relation to the other on a vertical axis and cannot be laterally displaced because of the engaging boss and ribs. The king-bolt has a nut and key and thus securing the parts together independent of gravity and thus differs from the usual construction.

Projecting diametrically through and projecting on opposite sides of the casting 43 and over the head of the king-bolt, is a bolt 47 carrying beyond the casting the free ends of a yoke 48, the arms of which extend downward through segmental recesses 49 on opposite sides of the plate or casting 40 and into the box bolster 26. This yoke engages ears 49' on opposite sides of the casing 50 of the universal gear structure shown in my aforesaid application, and which is only conventionally shown in the accompanying drawings.

In Fig. 2, the drive shaft 51 of this transmission gear is shown at an angle to the longitudinal central plane of the truck. This is done to indicate approximately the extent of movement the truck may have about the king bolt without interfering with the transmission of power from the drive shaft 51 through the universal transmission gear. From the transmission gear extends a shaft 52 mounted in journal boxes 53 on the channel beams 24, and at each end the shaft 52 carries a bevel pinion 54 meshing with a similar bevel pinion 55 fast on the respective axle 19. While I have shown bevel pinions of ordinary type in the drawing, it is to be understood that I prefer to use the roller type of pinions shown in my aforesaid application, and, therefore, the showing in the drawing of this application with respect to the pinions is to be taken as illustrative only. The yoke 48, being fast to the car body, participates in the movements of the car body and the transmission gear casing 50 participates in all movements, relative or actual, of the car body on a vertical axis. Those movements of the car body which are permitted by the spring 35 are not participated in by the transmission gear, for in such case the yoke 48 slides up and down through the ears 49.

It will be understood that the bolster 26, if made of solid plates, will be suitably slotted or perforated for parts which must pass through the same. For instance, it may be provided with slots such as indicated at 56 in Fig. 3 for the passage of the shaft 52.

The wheel brakes are indicated at 57 and their hangers at 58. Since the brake rigging forms no part of the present invention, it is not herein shown in detail and may be of the ordinary type, but as here shown is part of the construction of my electrically-operated air brake system forming the subject-matter of another application.

The brake hangers are carried by rockshafts 60 through which, by suitable connections from the brake cylinders individual to each truck, the brakes are applied or released.

On each side of the truck between the wheels and carried by the arch bar 3 is an electric track shoe 59 which need not be herein described or shown in detail, since it forms the subject-matter of another application for Letters-Patent. It may be stated, however, that this track shoe is designed to overcome the effects of centrifugal force when a car enters a curve, so that the car may take a curve at as high speed as when running on the straight track, even when the curve is sharp, and the shoe is also designed to augment the wheel brakes on an emergency application of the air brake system with which, under the general system to which this invention relates, all the cars are supplied. The application of the track brake under emergency conditions means very heavy strains upon the truck structure, and the present invention is designed to produce a truck structure which will resist such strains, as well as the more common strains and stresses due to the exigencies of high speed traffic.

In Fig. 1 the box girder and castings 40 and 43 constituting the structure by which the car is secured to the truck is shown rather high above the truck. It will be understood, however, that these parts will be of proper height and suitably constructed for individual cases, and are of course not necessary to the proposition shown in the drawings.

I claim:—

1. In a truck structure for railway cars, a side frame therefor composed of an upper tie bar having pedestals formed on the ends thereof and projecting downward therefrom, and a lower tie bar and arch bar both secured to and connecting the lower ends of the pedestals.

2. In a truck structure for railway cars, a side frame therefor composed of an upper composite tie bar formed of two like members spaced apart but connected together and each formed on the ends with like pedestal sections also spaced apart but connected together and projecting downward from the tie bar, and a lower tie bar and arch bar both secured to and connecting the lower ends of the pedestal.

3. In a truck structure for railway cars, a side frame therefor composed of an upper tie bar having pedestals formed on the ends thereof and projecting downward therefrom, a lower tie bar and arch bar both secured to and connecting the lower ends of the pedestals, journal boxes for the car wheel axles movable in the pedestals, and springs interposed between the top of the axle boxes and the crown of the pedestals.

4. In a truck structure for railway cars, a side frame therefor composed of an upper tie bar having pedestals formed on the ends thereof and projecting downward therefrom, a lower tie bar and arch bar both secured to and connected with the lower ends of the pedestals, cross channel beams secured to and connecting the lower tie bar and arch bar on each side of the truck, and brackets connecting the channel bars and top tie bar of each side frame.

5. In a truck structure for railway cars, side frames therefor carrying the pedestals for the car axle journal boxes, cross beams spaced apart and connecting the side frames, a box girder upon which the car body is mounted, springs carried by the side frames, an equalizer bar upheld by each side spring, and pivotal links between the girder and equalizer bar.

6. In a truck structure for railway cars, side frames connecting the car axles, an elliptical spring extending lengthwise of each side frame, hangers for the spring supported by the side frame near the journal boxes for the car axles, an equalizer bar supported midway of the spring, a girder for supporting the car body, and link connections between the girder and equalizer bar.

7. In a truck structure for railway cars, side frames thereof carrying the pedestals for the car axle journal boxes, an elliptical spring extending lengthwise of each side frame, hangers for the spring supported by the respective side frame near the journal boxes for the car axles, springs interposed between the hangers and the ends of the elliptical spring, an equalizer bar supported midway of the spring, a girder for supporting the car body, and link connections between the girder and equalizer bar.

8. In a truck structure for railway cars, side frames connecting the car axles, an elliptical spring extending lengthwise of each side frame, saddle hangers adjacent to the car axle journal boxes and supported by the respective side frames, a spring carried by each hanger, a stirrup bolt carried by each of said springs, an elliptical spring extending lengthwise of the respective side frame of the truck and upheld at its ends by the respective stirrup bolt, an equalizer bar supported midway of the spring, a girder for supporting the car body, and link connections between the girder and equalizer.

9. In a truck structure for railway cars, side frames connecting the car wheel axles, an elliptical spring extending lengthwise of each side frame and connected to said side frame near the journal boxes of the axles, an equalizer bar over-riding the central portion of the elliptical spring, a gib roller interposed between the spring and the central portion of the equalizer bar, hangers engaging the free ends of the equalizer bar, a cross girder for the car body, and link connections between said girder and said hangers.

10. A truck structure for railway cars, a cross girder for supporting the car body, equalizer bars carrying said cross girder, springs interposed between each equalizer bar and the corresponding end frame of the truck, and other springs interposed between each end frame of the truck and the corresponding journal boxes for the car axles.

11. In a truck structure for railway cars, side frames connecting the car axles, channel cross beams spaced apart and connecting the side frames between the car wheels and located near the bottom of the side frames, braces leading from said channel beams to the tops of the side frames, a box girder fitting between and guided by the channel beams and braces, and spring connections between the box girder and the side frames of the truck.

12. In a truck structure for railway cars, side frames each composed of a top tie bar, pedestals depending from the ends of the bar, a lower tie bar connecting the lower ends of the pedestals, an arch bar also connecting the lower ends of the pedestals, cross channel beams connected to the bottom tie bar and arch bar of each side frame and extending from one side frame to the other, braces connecting the channel beams to the top tie bars of the frames, a box girder between the channel beams and braces connected thereto, a bearing plate on top of the girder forming a pivotal support for a car body, springs interposed between the girder and side frames of the truck, and other springs interposed between the side frames and the car axle journal boxes.

13. In a truck structure for railway cars, a transmission gearing mounted on the car truck in the vertical axis thereof and connected to the axles, driving means for the transmission gearing leading from the car body, and means for maintaining the transmission gearing on the truck in alinement with the car body but permitting relative vertical movement between the car body and the transmission gearing.

14. In a truck structure for railway cars, a transmission gearing mounted on the car truck and connected to the axles, driving means for the transmission gearing leading from the car body, and a yoke fast on the car body and straddling the vertical axis of the truck and engaging the transmission gearing to constrain it to remain in alinement with the car body.

15. In a truck structure for railway cars, a transmission gearing mounted on the car truck and connected to the axles, driving means for the transmission gearing leading from the car body, and a yoke hung pendently from the horizontal axis at right angles to the vertical axis of the car truck, said yoke straddling the vertical axis of the car truck and engaging the transmission gearing and constraining it to remain in alinement with the car body.

In testimony that I claim the foregoing as my own, I have hereto affixed my signature in the presence of two witnesses.

WILLIAM C. MAYO.

Witnesses:
WM. ADAMS,
G. N. DYER.